United States Patent
Willems et al.

(10) Patent No.: US 11,556,537 B2
(45) Date of Patent: Jan. 17, 2023

(54) QUERY PLAN GENERATION AND EXECUTION BASED ON SINGLE VALUE COLUMNS

(71) Applicant: SAP SE, Walldorf (DE)

(72) Inventors: Paul Willems, Heidelberg (DE); Christina Teflioudi, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 142 days.

(21) Appl. No.: 16/370,556

(22) Filed: Mar. 29, 2019

(65) Prior Publication Data

US 2020/0311080 A1 Oct. 1, 2020

(51) Int. Cl.
*G06F 16/00* (2019.01)
*G06F 16/2453* (2019.01)
*G06F 16/22* (2019.01)

(52) U.S. Cl.
CPC ...... *G06F 16/24542* (2019.01); *G06F 16/221* (2019.01)

(58) Field of Classification Search
CPC .......................... G06F 16/24542; G06F 16/221
USPC .................................................. 707/600–899
See application file for complete search history.

(56) References Cited

U.S. PATENT DOCUMENTS

| | | | |
|---|---|---|---|
| 5,644,763 A * | 7/1997 | Roy | G06F 16/2246 |
| 6,581,055 B1 * | 6/2003 | Ziauddin | G06F 16/24547 707/999.004 |
| 2011/0029508 A1 * | 2/2011 | Al-Omari | G06F 16/24542 707/718 |
| 2015/0324382 A1 * | 11/2015 | Seufert | G06F 16/14 707/696 |
| 2016/0335057 A1 * | 11/2016 | Teodorescu | G06F 16/9566 |
| 2019/0384846 A1 * | 12/2019 | Mathur | G06F 16/24524 |

* cited by examiner

*Primary Examiner* — Irete F Ehichioya
*Assistant Examiner* — Shirley D Hicks
(74) *Attorney, Agent, or Firm* — Mintz Levin Coh Ferris Glovsky and Popeo, P.C.

(57) ABSTRACT

Aspects of the current subject matter are directed to executing queries on tables in which one or more columns contain a single value. Upon execution of a query, columns in which a single value is contained are identified, and a pre-compiled code entry containing relevant identifying information is compiled as part of a query execution plan. The query execution plan is used for subsequent query executions, alleviating the need to access the columns during the subsequent query executions that involve the columns. A fingerprint value may be used to track if changes to relevant tables occur.

18 Claims, 4 Drawing Sheets

| Pre-Compiled Code Entry 201A |
| --- |
| Database Identifier 202A |
| Table Identifier 204A |
| Column Identifier 206A |
| Single Value Data 208A |
| Fingerprint Value 210A |

| Pre-Compiled Code Entry 201B |
| --- |
| Database Identifier 202B |
| Table Identifier 204B |
| Column Identifier 206B |
| Single Value Data 208B |
| Fingerprint Value 210B |

⋮

| Pre-Compiled Code Entry 201N |
| --- |
| Database Identifier 202N |
| Table Identifier 204N |
| Column Identifier 206N |
| Single Value Data 208N |
| Fingerprint Value 210N |

FIG. 2

QUERY PLAN GENERATION AND EXECUTION BASED ON SINGLE VALUE COLUMNS

FIELD

The present disclosure generally relates to database management and, more specifically, to query execution on database tables.

BACKGROUND

Database management systems have become an integral part of many computer systems. For example, some systems handle hundreds if not thousands of transactions per second. Some systems perform very complex multidimensional analysis on data. In both cases, the underlying databases may need to handle responses to queries very quickly in order to satisfy systems requirements with respect to transaction time. Given the complexity of these queries and/or their volume, the underlying databases face challenges in optimizing performance.

SUMMARY

Methods, systems, and articles of manufacture, including computer program products, are provided for executing queries on tables in which one or more columns contain a single value.

According to aspects of the current subject matter, a computer-implemented method may include: receiving, at a database execution engine, a query, where the query requires accessing of a table including a plurality of columns; evaluating, by the database execution engine, data contained in the plurality of columns to identify a first column containing a single value of data; generating, by the database execution engine, pre-compiled code including at least the single value of data; and executing, by the database execution engine, the query, where the execution is at least partially based on the single value of data in the pre-compiled code.

In an inter-related aspect, a system includes at least one data processor, and at least one memory storing instructions which, when executed by the at least one data processor, result in operations including: receiving a query, where the query requires accessing of a table comprising a plurality of columns; evaluating data contained in the plurality of columns to identify a first column containing a single value of data; generating pre-compiled code including at least the single value of data; and executing the query, where the execution is at least partially based on the single value of data in the pre-compiled code.

In an inter-related aspect, a non-transitory computer-readable storage medium includes program code, which when executed by at least one data processor, causes operations including: receiving, at a database execution engine, a query, where the query requires accessing of a table comprising a plurality of columns; evaluating, by the database execution engine, data contained in the plurality of columns to identify a first column containing a single value of data; generating, by the database execution engine, pre-compiled code including at least the single value of data; and executing, by the database execution engine, the query, where the execution is at least partially based on the single value of data in the pre-compiled code.

In some variations, one or more of the features disclosed herein including the following features can optionally be included in any feasible combination. A fingerprint value may be associated with the pre-compiled code, where the fingerprint value is equal to a counter value associated with the table at a time of the identification of the first column containing the single value of data. The database execution engine may receive a subsequent query, where the subsequent query requires data from the first column; and the database execution engine may access the pre-compiled code to obtain the single value of data for execution of the subsequent query. The database execution engine may compare, in response to receipt of the subsequent query, the fingerprint value with a current counter value. The single value of data may be utilized for execution of the subsequent query in response to the fingerprint value being equal to the current counter value; and the single value of data may not be utilized for execution of the subsequent query in response to the fingerprint value not being equal to the current counter value. The database execution engine may evaluate, in response to the fingerprint value not being equal to the current counter value, updated data contained in the plurality of columns of the table; the database execution engine may identify an update to the first column, the first column containing an updated single value of data; and the database execution engine may update the pre-compiled code with the updated single value of data. The database execution engine may update the fingerprint value as equal to the current counter value. The pre-compiled code may include data to identify a database in which the table is stored, the table, and/or the first column. The pre-compiled code may be part of a query execution plan.

It is to be understood that both the foregoing general description and the following detailed description are exemplary and explanatory only and are not restrictive. Further features and/or variations may be provided in addition to those set forth herein. For example, the implementations described herein may be directed to various combinations and sub-combinations of the disclosed features and/or combinations and sub-combinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 is an example representation of compiled code consistent with implementations of the current subject matter;

Figure 1:
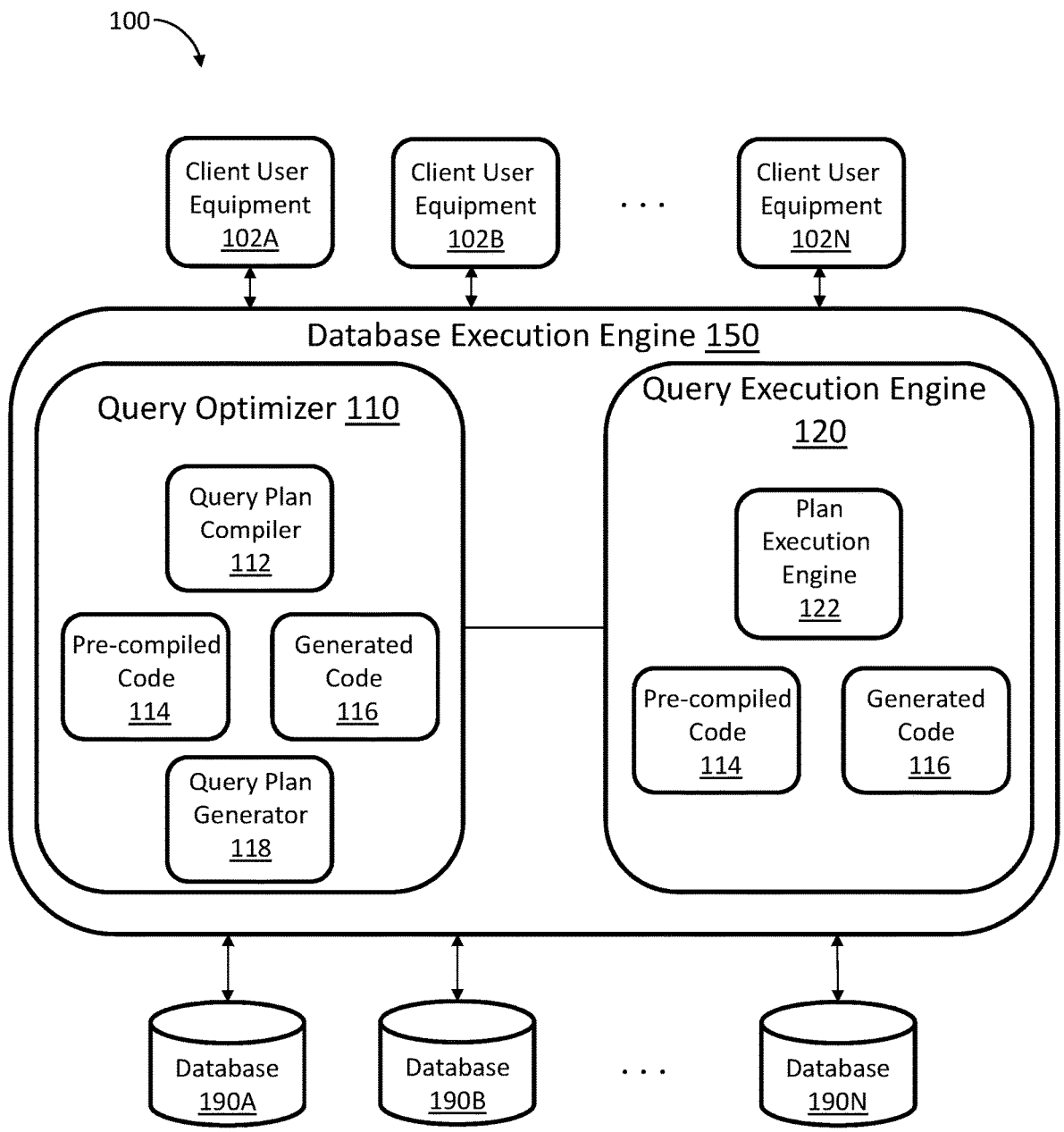
FIG. 1 is a block diagram illustrating a system architecture in which implementations of the current subject matter may be employed.

Like labels are used to refer to same or similar items in the drawings.

DETAILED DESCRIPTION

Aspects of the current subject matter are directed to executing queries on tables in which one or more columns contain a single value. Although the following description focuses on column-store databases, the described computer-implemented methods, computer-program products, and systems are applicable to other types of databases, for example row-store databases.

A table stored in a database may include a column in which a single value is contained in the column. In fact, this situation may exist across multiple columns in a single table. For example, a particular column may be related to a certain type of code or identifier that is not applicable to any of the entities for which data is stored in respective rows of the table. The column may then include one value, for example a null value or a zero, for each of the entities, resulting in the column having a single value. In other examples, due to other circumstances, a column may contain a single value.

During query execution, the column may need to be accessed to return a result to a client. In some instances, the column may be used in various forms in the query, such as having a filter applied to the column. Each column access results in resource expenditure. For example, to read values from columns, a lock may be acquired on the columns to ensure data is not being modified in parallel. In scenarios in which single or few rows are selected or needed for the query execution, a large overhead may be introduced by locking the entire column to read a single value. The amount of queries that can be handled is then limited. In addition to limiting the number of queries at a given time, the column access adds time to the query execution.

Moreover, in situations in which one or more columns of a table contain a single value, duplicative query execution may occur. For example, in a case in which for example three columns contain respective single values, each time a query requiring data from the three columns is received, the same query execution (or portion of a query execution) takes place. This clearly results in unnecessary, duplicative resource expenditures by repeatedly executing the same query (or portion of a query).

Consistent with implementations of the current subject matter, the single value contained in a column is compiled in a query execution plan, which results in the column in which the single value is contained not needing to be accessed during query execution. Implementations of the current subject matter include ensuring that the query execution plan is applicable or valid for each query execution requiring access to the column. In particular, aspects of the current subject matter provide for an efficient check utilizing a fingerprint associated with the query execution plan to determine validity of the single value that is incorporated in the query execution plan. Additional details are provided herein.

Database management systems and operations performed on data managed by a database management system have become increasingly complex. For example, a database management system (or database for short) may support relatively complex online analytical processing (OLAP, which may perform multi-dimensional analysis) to more straightforward transaction based online transaction processing (OLTP). Moreover, the database may be configured as a row-store database or column-store database, each of which may have certain aspects with respect to queries and other operations at the database. For example, the database may encode data using dictionaries, while some databases may not. In addition to these various database layer differences, the queries performed at a database may include a complex sequence of operations to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it may be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

Consistent with implementations of the current subject matter, an execution engine is provided that may decouple the higher-level, application layer from the database layer (e.g., the persistence or storage layer where data including database tables may be stored and/or queried using instructions, such as commands and/or the like). The execution engine may be implemented separately from the database layer and/or the application layer. Furthermore, the execution engine may be configured to receive a query, generate a query plan (including for example query algebra), optimize the query plan, and/or generate executable code, which may be executed at runtime. The executable code may include pre-compiled code (which may be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Furthermore, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein may perform query execution for a variety of database types and send queries to the different types of database layers (and/or their storage/persistence layer) and handle the corresponding responses.

FIG. 1 depicts an example of a system 100 in which implementations of the current subject matter may be employed.

The system 100 may include one or more client user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A-N represent the database layer of a database management system where data may be persisted and/or stored in a structured way, and where the data may be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra." The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at the database layer 190A-N, for example.

A query plan compiler 112 may enable compilation of some, if not all, of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

In some implementations, the query optimizer 110 may optimize the query plan by compiling and generating code. Moreover, the query optimizer 110 may optimize the query plan to enable pipelining during execution.

The query execution engine 120 may receive, from the query plan generator 118, compiled code to enable execution of the optimized query plan, although the query execution engine 120 may also receive code or other commands directly from a higher-level application or other device, such as user equipment 102A-N.

The code 114, 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 150 and sending some of the operations (or commands in support of an operation, such as a read, write, and/or the like) for execution at one or more of databases layers 190A-N.

In some implementations, the query execution engine 120 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 120 may perform execution related to handling the differences between these two types of databases. This may enable a reduction in processing at the database layer 190A-N. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the database's persistence/storage layer 190A-N can perform simpler operations to reduce the processing burden at the database's persistence/storage layer 190A-N.

In some example embodiments, the query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

As previously described herein, a table stored at the database layer 190A-N may include a column in which a single value is contained in the column. Consistent with implementations of the current subject matter, the single value is identified and stored as at least a portion of the pre-compiled code 114. By incorporating the single value into the pre-compiled code 114 as part of the query execution plan, the single value is available for query execution by the query execution engine 120 without directly accessing the column.

Consistent with implementations of the current subject matter, when the query execution engine 120 performs a query execution operation involving a database table for a first time, the columns of the table may be evaluated to identify any columns of the table that include a single value. Upon an identification of a column containing a single value, the query plan compiler 112 may create a pre-compiled code entry (or portion of the pre-compiled code 114) that includes information to identify, for example, the relevant database layer 190A-N, the table, the column, and the single value. The pre-compiled code entry is thus compiled as part of a query execution plan and may also include a fingerprint that may be used by the query execution engine 120 for subsequent query executions to determine if changes to the relevant table have occurred.

With reference to FIG. 2, an example representation of pre-compiled code entries 201A-N of the pre-compiled code 114 is illustrated. Each entry 201A-N may include a database identifier 202A-N, a table identifier 204A-N, a column identifier 206A-N, a single value data 208A-N, and a fingerprint value 210A-N. The pre-compiled code 114 may include multiple such entries (201A-201N) for columns in which single values are contained.

Consistent with implementations of the current subject matter, a check at query execution to determine if changes have occurred to the table (by utilizing the fingerprint value as further described herein) utilizes resources less than those required in directly accessing the table for the query execution.

Consistent with implementations of the current subject matter, the fingerprint value is set to be equal to a counter value associated with the table at the time of compilation of the query execution plan. The counter value represents changes made to the table. For example, if a change to the table occurs, the counter value is increased by one. Upon query execution plan generation or compilation by, for example, the query plan compiler 112 and/or the query plan generator 118, the current value of the counter value is stored in the query execution plan (e.g., as a portion of the pre-compiled code 114) as the fingerprint value 210. During query execution, the database execution engine 150 (e.g., the query execution engine 120) compares the counter value of the table to the fingerprint value 210. A difference between the values serves as an indication that the table has been changed and a recompile or regeneration of the query execution plan is required.

For example, for subsequent queries, a comparison between the counter value and the fingerprint value is made. If the values are equal, this serves as an indication that the table has not changed, and thus the single value of the column remains the same (i.e., no changes to the table occurred, thus the single value could not have changed). The single value of the column as defined in the pre-compiled code 114 may be safely used for the query execution. If however the values are not equal, this serves as an indication that the table has changed and that the single value of the column as defined in the pre-compiled code may not be valid. In this situation, the query execution plan needs to be recompiled to allow for the query execution plan to be updated to reflect any changes made to the column (and to the table for other aspects of the query execution plan).

In this manner, the fingerprint value 210 may be used to determine if changes to the table have occurred. As described, if changes have occurred, the single value of the column may not be applicable for a query. Therefore, if changes have occurred as indicated by the fingerprint value 210, consistent with implementations of the current subject matter, the query execution engine 120 does not utilize the portion of the pre-compiled code 114 related to the relevant table. That is, the query execution engine 120 disregards the pre-compiled code entry 201 containing the single value data 208 as such data may be invalid due to the table changes that have occurred. Instead, the query execution engine 120 may execute the query by accessing the column (if needed for query execution).

If changes to the table have occurred, the query execution plan needs to be updated if the table changes have affected the query execution plan. As such, consistent with implementations of the current subject matter, a recompile operation may be performed by the query plan generator 118. The recompile operation includes in part the column of the table (which previously contained a single value stored as at least a portion of the pre-complied code 114 of the query execution plan) being evaluated to identify if the single value has changed. That is, if during query execution of the pre-compiled code 114, the fingerprint indicates a change to the table, the indication triggers a recompile (or regeneration) of the query execution plan for a new query execution plan that takes into account changes made to the table. The recompilation and regeneration may identify, among other changes, if the single value of the column has changed due to the updates to the table. If it is determined that the table change did affect the single value of the column, the single value data 208 is updated in the recompiled query execution plan. If there is no longer a single value in the column, the query execution plan is also updated to reflect this change. Moreover, once the recompile of the query execution plan occurs, the fingerprint value 210 is updated to indicate that changes made to the table are reflected in the query execution plan. That is, as the counter value is increased, the fingerprint value 210 is increased once the recompile and regeneration of the query execution plan occurs so that the new fingerprint value 210 is reflective of the table and updates made at the time of the recompile.

In some implementations, the counter value may represent a fragment of the table, for example a set of partial columns. Thus a change to the counter value represents a change to the set of partial columns. In some instances, the counter value may be a running 64 bit integer. Consistent with some implementations of the current subject matter, the fingerprint value is changed on an update if the single value in one column of the set of partial columns changed.

In additional implementations of the current subject matter, the counter value may represent a single column. Thus a change to the counter value represents a change to the single column.

In some implementations, a first fingerprint value may represent a fragment of the table, while a second fingerprint value may represent a column of the fragment of the table. A first counter value is applied for the fragment of the table, and a second counter value is applied for the column of the fragment of the table. Additional fingerprint values and counter values may be incorporated for additional columns. The first fingerprint value may be used to determine if changes to the fragment of the table are made. If the first fingerprint value does not match the first counter value, indicating a change to the fragment of the table occurred, the second fingerprint value may be checked to determine if the column was updated. The fingerprint values may be updated on recompile of the query execution plan.

The query plan generation and execution based on single value columns consistent with implementations of the current subject matter provides optimization for queries on tables by compiling the single value into the query execution plan. This advantageously results in columns not needing to be accessed during query execution. A fingerprint mechanism consistent with implementations of the current subject matter tracks updates to the table to indicate if the single value should be used or if the query execution plan needs to be recompiled upon a subsequent execution. As a number of applications may have data in which columns contain single values, the query optimization consistent with implementations of the current subject matter reduces processing time of queries for these applications.

Figure 3:
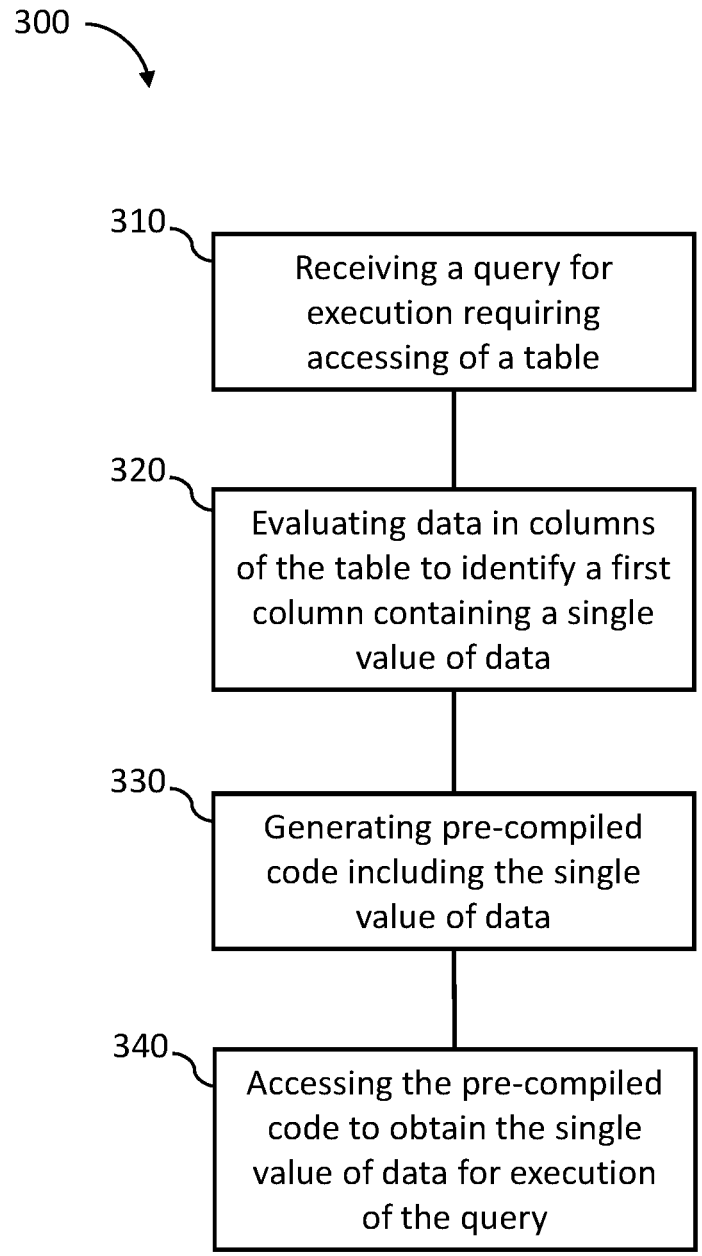
FIG. 3 depicts a flowchart illustrating a process for executing queries consistent with implementations of the current subject matter.

FIG. 3 depicts a flowchart 300 illustrating a process for executing queries on tables consistent with implementations of the current subject matter.

At 310, a query is received at the database execution engine 150. The query may be generated, for example, by the client user equipment 102A-N and submitted to the database execution engine 150. The query may require accessing a table including a plurality of columns from one or more of the databases 190A-N.

At 320, the database execution engine 150 evaluates data contained in the plurality of columns of the table to identify a first column containing a single value. Additional columns may also be identified as having a single value. The evaluation and identification of the first column containing the single value may also be used for subsequent queries by compiling the single value into pre-compiled code that may be part of a query execution plan for the database execution engine 150, consistent with implementations of the current subject matter as described herein.

At 330, the database execution engine 150 generates pre-compiled code (e.g., the pre-compiled code 114) including the single value identified in the first column of the table. The pre-compiled code may further include data to identify a database 190A-N at which the table is stored, the table, and/or the first column. The pre-complied code may also include a fingerprint value equal to a counter value of the table or a fragment of the table in which the first column is included. As the counter value is increased upon changes made to the table, the fingerprint value may be used to indicate a status of an update to the table. That is, the fingerprint value indicates if the table has been changed (by comparing the fingerprint value to the counter value), which may affect subsequent queries. For example, if the table has been updated, there is a chance that the single value of the first column is no longer accurate. Thus, the fingerprint value is used as a check to determine if the single value, which is part of the pre-compiled code and query execution plan, should be used.

At 340, the database execution engine 150 accesses the pre-compiled code to obtain the single value of data for execution of the query. Additional pre-compiled code 114 and/or generated code 116, as well as other operations, may also be needed to execute the query. However, the use of the stored single value of the first column consistent with implementations of the current subject matter reduces processing resources that would otherwise be needed to access and lock the column.

Consistent with implementations of the current subject matter, the database execution engine 150 may update, in response to a determination that an update to the table has occurred, the fingerprint value. The fingerprint value may be associated with the pre-compiled code, where the fingerprint value is equal to a counter value associated with the table at a time of the identification of the first column containing the single value of data (i.e., at the time of compilation of the query execution plan that includes the pre-compiled code).

In response to receiving a subsequent query, the database execution engine 150 may access the fingerprint value and the counter value of the table or fragment of the table. The single value of data associated with the first column (as well as other portions of the pre-compiled code) may be utilized by the database execution engine 150 in response to the fingerprint value indicating that a table update has not occurred. On the other hand, the single value of data associated with the first column (as well as other portions of the pre-compiled code) is not utilized by the database execution engine 150 if the fingerprint value indicates that a table update has occurred.

Moreover, consistent with some implementations of the current subject matter, in response to the fingerprint value indicating a table update, the database execution engine 150 may evaluate updated data contained in the updated table to determine if the pre-compiled code 114 needs to be updated to reflect a new single value, as well as other changes to the query execution plan that are affected by the table update. For example, the database execution engine 150 may generate new or updated pre-compiled code (i.e., a recompiled or regenerated query execution plan) including the new single value of data for part of a query execution plan. The new or updated pre-compiled code may be used for future query executions requiring data from the column.

Moreover, consistent with some implementations of the current subject matter, in response to the fingerprint value indicating a table update, the database execution engine 150 may execute the subsequent query by accessing the updated table. As described herein, this removes the chance that the database execution engine 150 is relying on and/or using outdated data that may result from the table updates.

Figure 4:
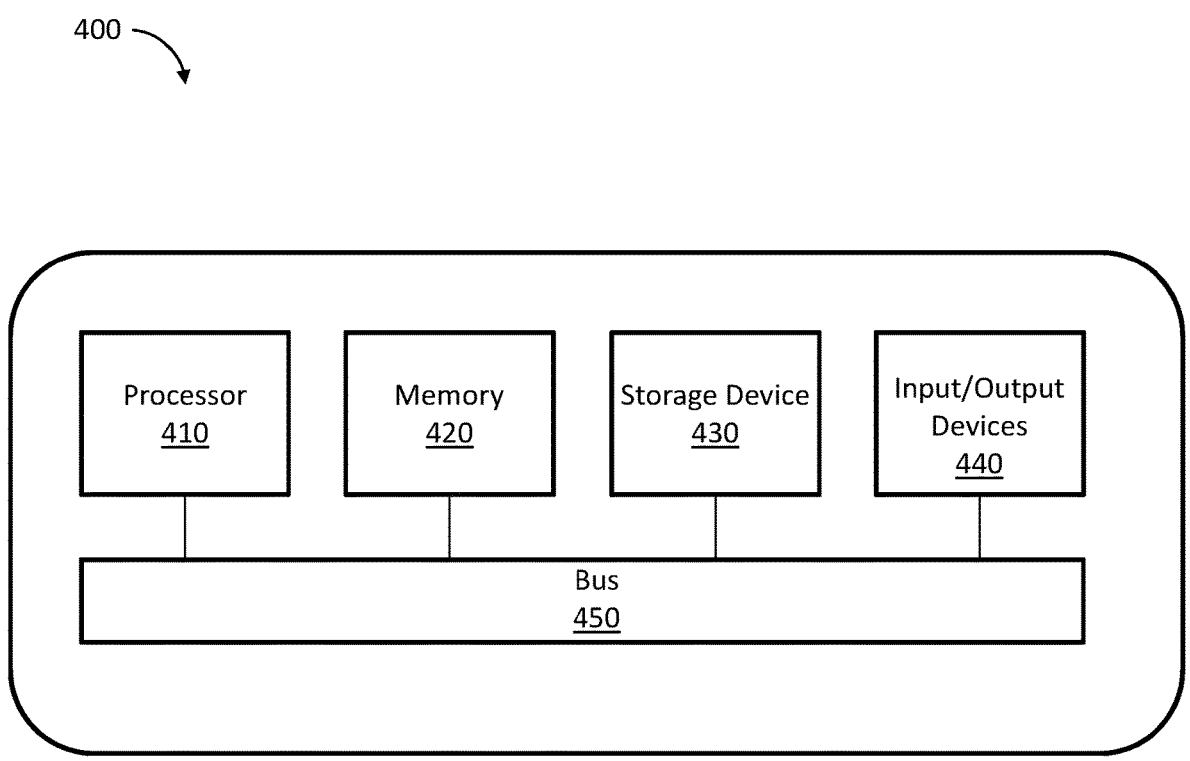
FIG. 4 depicts a block diagram illustrating a computing system consistent with implementations of the current subject matter.

FIG. 4 depicts a block diagram illustrating a computing system 400 consistent with implementations of the current subject matter. Referring to FIG. 1, the computing system 400 can be used to implement the system 100 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the system 100. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of or "one or more of may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an un recited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method, comprising:
   identifying, by a database execution engine, a first column containing a single value of data, the first column in a table including a plurality of columns, the single value of data including an identical value for each row in the first column;

in response to identifying the first column containing the single value of data, generating, by the database execution engine, pre-compiled code including a first column identifier of the first column, the single value of data, and a fingerprint value to enable a determination of whether to avoid accessing the first column containing the single value of data during query execution, the fingerprint value equal to a counter value associated with the table at a time of identification of the first column containing the single value of data, the counter value indicative of changes made to the table such that the counter value is incremented upon a change to the table;

receiving, at the database execution engine, a query, the query requiring access of the table;

comparing, by the database execution engine, the fingerprint value with a current counter value; and executing, by the database execution engine, the query, wherein the execution of the query is, in response to a determination that the fingerprint value equals the counter value, at least partially based on the pre-compiled code that includes the single value of data, and wherein the execution of the query is, in response to a determination that the fingerprint value does not equal the current counter value, based on the database execution engine accessing the table to satisfy the query.

2. The computer-implemented method of claim 1, further comprising:

receiving, at the database execution engine, a subsequent query, wherein the subsequent query requires data from the first column; and accessing, by the database execution engine, the pre-compiled code to obtain the single value of data for execution of the subsequent query.

3. The computer-implemented method of claim 1, wherein the single value of data is utilized for execution of the query in response to the fingerprint value being equal to the current counter value; and wherein the single value of data is not utilized for execution of the query in response to the fingerprint value not being equal to the current counter value.

4. The computer-implemented method of claim 1, further comprising:

evaluating, by the database execution engine and in response to the fingerprint value not being equal to the current counter value, updated data contained in the plurality of columns of the table;

identifying, by the database execution engine, an update to the first column, the first column containing an updated single value of data; and updating, by the database execution engine, the pre-compiled code with the updated single value of data.

5. The computer-implemented method of claim 4, further comprising:

updating, by the database execution engine, the fingerprint value as equal to the current counter value.

6. The computer-implemented method of claim 1, wherein the pre-compiled code further comprises data to identify a database in which the table is stored and/or data to identify the table.

7. The computer-implemented method of claim 1, wherein the pre-compiled code is part of a query execution plan.

8. A system, comprising:

at least one data processor; and at least one memory storing instructions which, when executed by the at least one data processor, result in operations comprising:

in response to identifying the first column containing the single value of data, identifying a first column containing a single value of data, the first column in a table including a plurality of columns, the single value of data including an identical value for each row in the first column;

generating pre-compiled code including a first column identifier of the first column, the single value of data, and a fingerprint value to enable a determination of whether to avoid accessing the first column containing the single value of data during query execution, the fingerprint value equal to a counter value associated with the table at a time of identification of the first column containing the single value of data, the counter value indicative of changes made to the table such that the counter value is incremented upon a change to the table;

receiving a query, the query requiring access of the table;

comparing the fingerprint value with a current counter value; and executing the query, wherein the execution of the query is, in response to a determination that the fingerprint value equals the counter value, at least partially based on the pre-compiled code that includes the single value of data, and wherein the execution of the query is, in response to a determination that the fingerprint value does not equal the current counter value, based on accessing the table to satisfy the query.

9. The system of claim 8, wherein the at least one memory storing instructions, when executed by the at least one data processor, result in further operations comprising:

receiving a subsequent query, wherein the subsequent query requires data from the first column; and accessing the pre-compiled code to obtain the single value of data for execution of the subsequent query.

10. The system of claim 8, wherein the single value of data is utilized for execution of the query in response to the fingerprint value being equal to the current counter value; and wherein the single value of data is not utilized for execution of the query in response to the fingerprint value not being equal to the current counter value.

11. The system of claim 8, wherein the at least one memory storing instructions, when executed by the at least one data processor, result in further operations comprising:

evaluating, in response to the fingerprint value not being equal to the current counter value, updated data contained in the plurality of columns of the table;

identifying an update to the first column, the first column containing an updated single value of data; and updating the pre-compiled code with the updated single value of data.

12. The system of claim 11, wherein the at least one memory storing instructions, when executed by the at least one data processor, result in further operations comprising:

updating the fingerprint value as equal to the current counter value.

13. The system of claim 8, wherein the pre-compiled code further comprises data to identify a database in which the table is stored and/or data to identify the table.

14. The system of claim 8, wherein the pre-compiled code is part of a query execution plan.

15. A non-transitory computer-readable storage medium including program code, which when executed by at least one data processor, causes operations comprising:

identifying, by a database execution engine, a first column containing a single value of data, the first column in a table including a plurality of columns, the single value of data including an identical value for each row in the first column;

in response to identifying the first column containing the single value of data, generating, by the database execution engine, pre-compiled code including a first column identifier of the first column, the single value of data, and a fingerprint value to enable a determination of whether to avoid accessing the first column containing the single value of data during query execution, the fingerprint value equal to a counter value associated with the table at a time of identification of the first column containing the single value of data, the counter value indicative of changes made to the table such that the counter value is incremented upon a change to the table;

receiving, at the database execution engine, a query, the query requiring access of the table;

comparing, by the database execution engine, the fingerprint value with a current counter value; and executing, by the database execution engine, the query, wherein the execution of the query is, in response to a determination that the fingerprint value equals the counter value, at least partially based on the pre-compiled code that includes the single value of data, and wherein the execution of the query is, in response to a determination that the fingerprint value does not equal the current counter value, based on the database execution engine accessing the table to satisfy the query.

16. The non-transitory computer-readable storage medium of claim 15, wherein the single value of data is utilized for execution of the query in response to the fingerprint value being equal to the current counter value; and wherein the single value of data is not utilized for execution of the query in response to the fingerprint value not being equal to the current counter value.

17. The non-transitory computer-readable storage medium of claim 16, causing operations further comprising:

evaluating, by the database execution engine and in response to the fingerprint value not being equal to the current counter value, updated data contained in the plurality of columns of the table;

identifying, by the database execution engine, an update to the first column, the first column containing an updated single value of data;

updating, by the database execution engine, the pre-compiled code with the updated single value of data; and updating, by the database execution engine, the fingerprint value as equal to the current counter value.

18. The computer-implemented method of claim 1, wherein the fingerprint values indicates a table update to the table including the first column containing the single value of data, such that the database execution engine access the table to satisfy the query rather than using the pre-compiled code to satisfy the query.

\* \* \* \* \*